Nov. 18, 1924.

J. Z. GRAHAM

PLOW

Filed Dec. 18, 1922

J. Z. Graham,
INVENTOR

BY Victor J. Evans
ATTORNEY

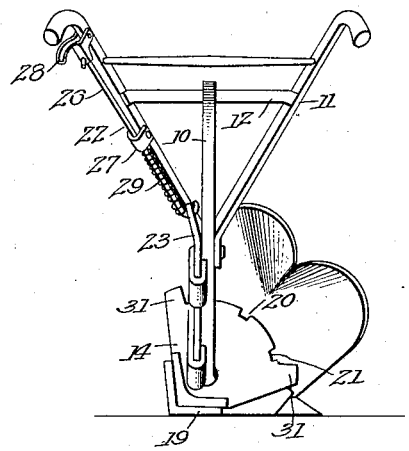
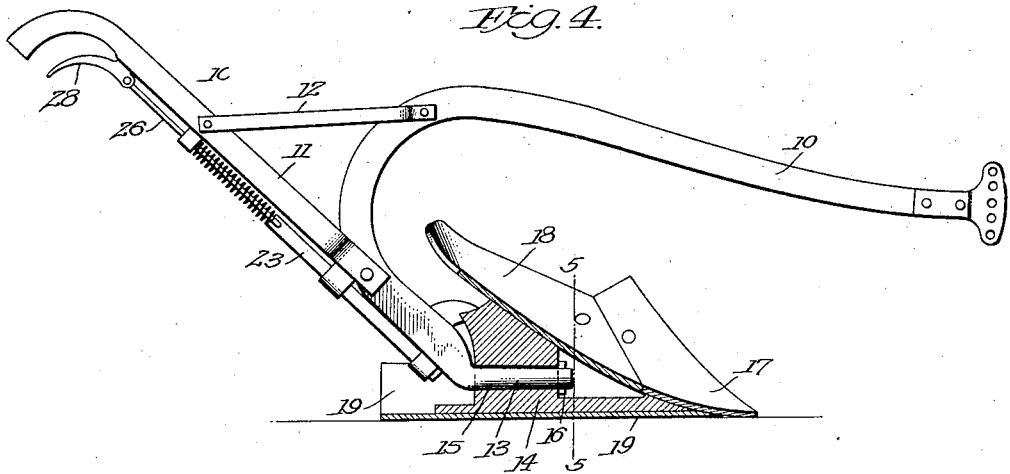

Nov. 18, 1924.

J. Z. GRAHAM

PLOW

Filed Dec. 18, 1922

J. Z. Graham, INVENTOR

BY Victor J. Evans

ATTORNEY

WITNESS:

Patented Nov. 18, 1924.

1,516,289

UNITED STATES PATENT OFFICE.

JOSEPH Z. GRAHAM, OF ALICIA, ARKANSAS.

PLOW.

Application filed December 18, 1922. Serial No. 607,663.

*To all whom it may concern:*

Be it known that I, JOSEPH Z. GRAHAM, a citizen of the United States, residing at Alicia, in the county of Lawrence and State of Arkansas, have invented new and useful Improvements in Plows, of which the following is a specification.

This invention relates to swivel or reversible type of plows and has for an object the provision of a plow which may be easily and quickly adjusted for ditching or furrowing and which is capable of adjustment for "breaking" either a right or left hand furrow.

Another object of the invention is the provision of a plow of this character which is simple of construction, easy of adjustment and which will be securely held in adjusted position.

With the above and other objects in view, the invention further includes the following novel features and details of construction, to be hereinafter more fully described, illustrated in the accompanying drawings and pointed out in the appended claims.

In the drawings:—

Figure 3 is a rear view.

Figure 4 is a central longitudinal sectional view.

Figure 1:
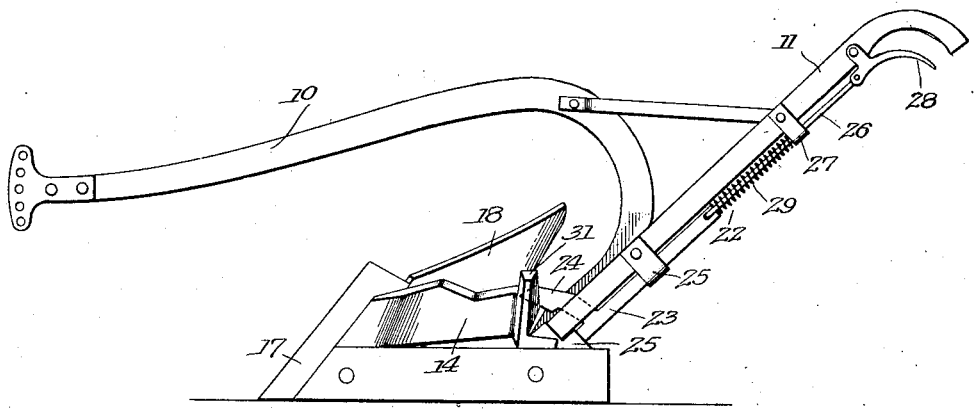
Figure 1 is a side elevation of a plow constructed in accordance with the invention.
Figure 2:
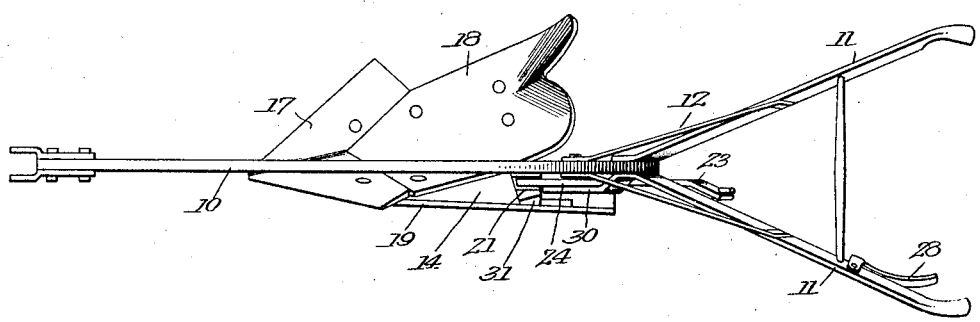
Figure 2 is a top plan view of the same.
Figure 5:
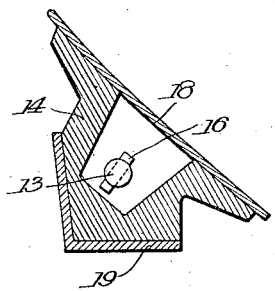
Figure 5 is a transverse sectional view on the line 5—5 of Figure 4.
Figure 6:
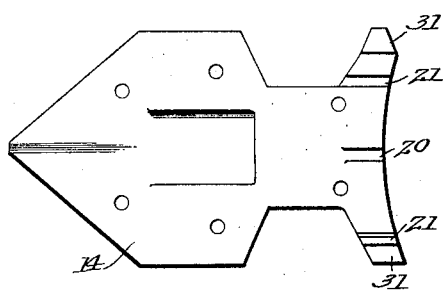
Figure 6 is a detail perspective view of the block.
Figure 7:
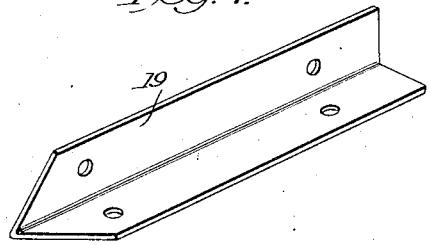
Figure 7 is a similar view of the landside.
Figure 9:
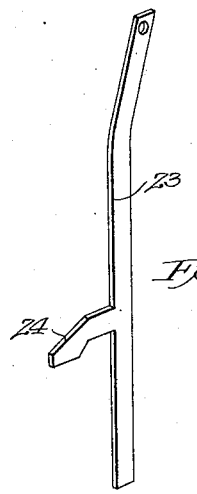
Figure 9 is a detail perspective view of said bar.
Figure 8:
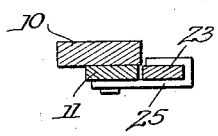
Figure 8 is an enlarged fragmentary section taken transversely through the plow beam and showing the guides for latch bar.

Referring in detail to the drawings, wherein like characters of reference denote corresponding parts, the reference character 10 indicates a plow beam, to which there is secured handles 11, having their lower ends connected to the beam and their upper ends connected by means of braces 12.

The lower end of the beam extends forwardly as shown at 13 to provide a bearing arm and mounted upon this bearing arm is a block 14, the latter being provided with an opening 15 which receives the arm 13 in a manner to permit the block to be adjusted pivotally upon the arm. The block is held in position upon the arm for this purpose by means of a retaining pin 16.

Secured to the lower forward end of the block 14 is a shoe 17, while secured to the block at the rear of the shoe is a mold board 18, the latter being removably secured in place so that access may be had to the pin 16 for the removal and replacement of the block 14. The shoe 17 is of double construction, as is also the mold board 18. That is, the said shoe and member is so shaped that when properly adjusted it will throw either a right or left hand furrow, or it may be arranged at an intermediate position for ditching. Secured to the bottom of the block 14 is a landside 19, which is substantially V-shaped in cross section so as to provide a landside for either side of the mold board 18, when the plow is arranged for either a right or left hand furrow.

In order to hold the plow in adjusted position with respect to the beam 10, the block 14 is provided with notches 20, and 21, the last named notches being outside notches while the notch 20 is an intermediate notch. Co-operating with these notches is a latch which is indicated in its entirety by the reference character 22. This latch includes a shank 23 and a dog 24, the shank being slidable through guides 25 secured to the handles 11 and having connected to one end a rod 26. This rod passes through a guide 27 and is secured to an operating handle 28, which is pivotally mounted upon one of the handles 11. A spring 29 serves to normally force the latch downward so that the dog 24 may engage any one of the notches 20—21. The handles 11 extend downwardly upon opposite sides of the beam 10 and in order to provide a guide for the dog 24, one of the handles is offset for a portion of its length as shown at 30, so that it will be spaced from the beam 10 and the dog 24 extends through and operates within this space.

The handle 28 may thus be operated to release the dog 24 from and engage the same within any one of the notches 20 or 21 so as to hold the plow in an intermediate position or in position for a right or left hand furrow. Stops 31 are provided upon the block beyond the notches 21 and in the path of the dog 24 so as to limit the pivotal movement of the block 14.

The invention is susceptible of various changes in its form, proportions and minor details of construction and the right is herein reserved to make such changes as properly fall within the scope of the appended claims.

Having described the invention what is claimed is:—

1. A plow comprising a beam, a block mounted for pivotal adjustment on said beam and provided with spaced notches arranged in arcuate formation at one end of the block, a spring actuated dog carried by the beam for engagement within the notches, to hold the block in adjusted position and stops extending from the block beyond the notches in the path of the dog.

2. A plow comprising a beam, a notched block mounted for pivotal adjustment on said beam, a blade carried by the block, handles secured to the beam, a slidingly mounted latch carried by the handles and engageable in the notches for holding the blade in adjusted position and an offset portion formed in one of the handles and spaced from the beam to provide a guide for the latch.

3. A plow comprising a beam, a notched block mounted for pivotal adjustment on said beam, a blade carried by the block, a latch slidingly mounted upon the plow and including a longitudinally movable spring actuated shank and a dog extending from said shank for engagement with the notches of the block to hold the blade in adjusted position and means whereby the latch may be operated to disengage the dog.

4. In a plow, a plow beam provided with a pintle at its lower end which extends in a horizontal plane, an earth engaging element including a triangular shaped casting having a horizontally arranged bore loosely received on the pintle and provided with a plurality of notches at its upper edge and a latch element carried by the beam and engageable in any one of the notches whereby to retain the casting in an adjusted position about the pintle.

5. A plow having its stock formed with a horizontally disposed pintle, an earth engaging element rotatably supported on the pintle and including a substantially triangular shaped element, journals carried by the beam, a pair of guides carried by the handle, a spring urged latch bar received in the guides and a laterally extending latch element carried by the bar and engageable in any one of the notches in the element whereby to hold the earth engaging element in an adjusted position with respect to the pintle.

In testimony whereof I affix my signature.

JOSEPH Z. GRAHAM.